United States Patent
Fudge

(10) Patent No.: US 8,249,129 B2
(45) Date of Patent: *Aug. 21, 2012

(54) WIDEBAND FREQUENCY HOPPING SPREAD SPECTRUM TRANSMITTERS AND RELATED METHODS

(75) Inventor: Gerald L. Fudge, Rockwall, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 937 days.

This patent is subject to a terminal disclaimer.

(21) Appl. No.: 12/290,191

(22) Filed: Oct. 28, 2008

(65) Prior Publication Data

US 2009/0161730 A1   Jun. 25, 2009

Related U.S. Application Data

(60) Provisional application No. 61/008,239, filed on Dec. 19, 2007.

(51) Int. Cl.
*H04B 1/00* (2006.01)

(52) U.S. Cl. ........ 375/135; 375/131; 375/132; 375/140; 375/239; 341/152; 341/177; 341/178; 341/181

(58) Field of Classification Search ............. 341/126, 341/144, 152, 173, 177–182, 184, 189; 375/130, 375/132, 133, 135, 140, 239
See application file for complete search history.

(56) References Cited

U.S. PATENT DOCUMENTS

| | | | |
|---|---|---|---|
| 5,014,018 A | 5/1991 | Rodwell et al. | 333/20 |
| 5,349,700 A | 9/1994 | Parker | 455/193.1 |
| 5,454,007 A | 9/1995 | Dutta | 375/78 |
| 5,832,026 A | 11/1998 | Li | 375/202 |
| 5,887,022 A | 3/1999 | Lee et al. | 375/202 |
| 6,266,518 B1 | 7/2001 | Sorrells et al. | 455/118 |
| 6,507,624 B1 | 1/2003 | Jachim et al. | 375/316 |
| 6,574,459 B1 | 6/2003 | Kaminski et al. | 455/272 |
| 6,577,670 B1 | 6/2003 | Roberts | 375/133 |
| 6,700,388 B1 | 3/2004 | Mayor et al. | 324/537 |
| 6,900,710 B2 | 5/2005 | Agoston et al. | 333/248 |
| 7,107,033 B2 | 9/2006 | du Toit | 455/296 |

(Continued)

FOREIGN PATENT DOCUMENTS

EP   1330036 A1   7/2003

(Continued)

OTHER PUBLICATIONS

Arthur, "Modern SAW-based pulse compression systems for radar applications, Part I: SAW matched filters," Electronics & Communication Engineering Journal, Dec. 1995, pp. 236-246.

(Continued)

*Primary Examiner* — David C. Payne
*Assistant Examiner* — James M Perez
(74) *Attorney, Agent, or Firm* — O'Keefe, Egan, Peterman & Enders LLP

(57) ABSTRACT

Systems and methods are disclosed that provide ultra-wideband frequency hopping spread spectrum (UWB-FHSS) solutions for transmit and receive architectures. These UWB-FHSS transmit and receive architectures can transmit signals over an extremely wide bandwidth while using a relatively slow analog-to-digital converter (ADC) without suffering from unacceptable performance degradation. For example, ADCs can be used having sample rates lower than standard Nyquist criteria would require for the bandwidth of the spread spectrum utilized.

19 Claims, 7 Drawing Sheets

U.S. PATENT DOCUMENTS

| | | | |
|---|---|---|---|
| 7,436,910 B2 | 10/2008 | Fudge et al. | 375/340 |
| 7,436,911 B2 | 10/2008 | Fudge et al. | 375/340 |
| 7,436,912 B2 | 10/2008 | Fudge et al. | 375/340 |
| 7,489,745 B2 | 2/2009 | Fudge | 375/340 |
| 7,496,158 B2 | 2/2009 | Fudge et al. | 375/340 |
| 2002/0161300 A1 | 10/2002 | Hoff et al. | 600/449 |
| 2003/0016762 A1 | 1/2003 | Martin et al. | 375/308 |
| 2003/0054783 A1 | 3/2003 | Mason et al. | 455/307 |
| 2004/0142701 A1 | 7/2004 | Abraham | 455/456.1 |
| 2005/0069046 A1 | 3/2005 | Tsui et al. | 375/260 |
| 2005/0085194 A1* | 4/2005 | Robinson et al. | 455/91 |
| 2005/0117069 A1 | 6/2005 | McNeely | 348/725 |
| 2005/0258992 A1* | 11/2005 | Fontaine et al. | 341/144 |
| 2006/0039449 A1 | 2/2006 | Fontanna et al. | 375/130 |
| 2007/0146185 A1* | 6/2007 | Kang et al. | 341/143 |
| 2009/0161729 A1 | 6/2009 | Fudge | 375/133 |
| 2009/0161731 A1 | 6/2009 | Fudge | 375/137 |
| 2011/0168891 A1* | 7/2011 | Van Der Weide et al. | 250/334 |

FOREIGN PATENT DOCUMENTS

| | | |
|---|---|---|
| KR | 10-2004-0051321 | 6/2004 |
| KR | 10-0712412 | 4/2007 |
| KR | 10-0724533 | 5/2007 |

OTHER PUBLICATIONS

Arthur, "Modern SAW-based pulse compression systems for radar applications, Part II: Practical systems," Electronics & Communication Engineering Journal, Apr. 1996, pp. 57-78.

Brandl et al., "High Speed Signal Processing with Tapped Dispersive SAW based Delay Lines," University of Technology, Applied Electronics Laboratory, Vienna Austria, IEEE 2000, pp. 171-176.

Burke, "Ultra-Linear Chirp Generation Via VCO Tuning Predistortion," AIL Systems, Inc., Deer Park, New York, IEEE 1994 MTT-S Digest, pp. 957-960.

Gerard et al., "The Design and Applications of Highly Dispersive Acoustic Surface-Wave Filters," Invited Paper, IEEE Transactions on Microwave Theory and Techniques, vol. MTT-21, No. 4, Apr. 1973, pp. 176-186.

Ong et al., "Digital LPI Radar Detector," Naval Postgraduate School Thesis, Monterey, California, Mar. 2001, pp. 1-81.

Grant et al., "Recent Advances in Analog Signal Processing," IEEE 1990, IEEE Transactions on Aerospace and Electronic Systems, vol. 26, No. 5, Sep. 1990, pp. 818-849.

Li et al, "On the Use of a Compressive Receiver for Signal Detection," IEEE 1991, IEEE Transactions on Communications, vol. 39, No. 4, Apr. 1991, pp. 557-566.

Levy et al, "VCO Based Chirp Generation for Broad Bandwidth Compressive Receiver Applications," AIL Systems, Inc., Deer Park, New York, IEEE 1993 MTT-S Digest, pp. 1113-1115.

Lucyszyn, "Review of radio frequency microelectromechanical systems technology," Imperial College, London, IEE Proc.-Sci. Meas. Technol.vol. 151, No. 2, Mar. 2004, pp. 93-103.

Lyons et al., "High Temperature Superconductive Wideband Compressive Receivers," Analog Device Technology Group, Lincoln Laboratory, Invited Paper, IEEE Transactions on Microwave Theory and Techniques, vol. 44, No. 7, Jul. 1996, pp. 1258-1278.

Unser, "Sampling—50 Years After Shannon," Swiss Federal Institute of Technology, Lausanne, Switzerland, IEEE 2000 Proceedings of the IEEE, vol. 88, No. 4, Apr. 2000, pp. 569-587.

Sengupta et al, "Novel Ferroelectric Materials for Phased Array Antennas," U.S. Army Research Laboratory, Aberdeen Proving Groud, 1997 IEEE, IEEE Transactions on Ultrasonics, Ferroelectrics, and Frequency Control, vol. 44, No. 4, Jul. 1997, pp. 792-797.

Serhan et al., "Automatic Frequency Control Techniques for Microwave Active Filters," Limoges University, Limoges, France, 1997 IEEE MTT -S Digest, pp. 697-700.

Whittaker et al, "Digital chirp filter processing for improved performance of sweeping spectrum analysers," University of Surrey, Surrey, UK, Electronics Letters, Aug. 3, 2000, vol. 36, No. 16, pp. 1430-1432.

Agoston et al, "100 GHz Through-Line Sampler System with Sampling Rates in Excess of 10 G samples/second," Picosecond Pulse Labs, Boulder, Colorado, PSPL—100 Sampler Paper—Submitted to MTT 2003, http://www.picosecond.com->products->sampler modules, 3 pgs.

Akbari-Dilmaghani et al, "A High Q RF CMOS Differential Active Inductor," Imperial College, London, 1998 IEEE International Conference on Electronics, Circuits and Systems, vol. 3, Sep. 7-10, 1998, pp. 157-160.

Akos et al, " Direct Bandpass Sampling of Multiple Distinct RF Signals," 1999 IEEE Transactions on Communications, Vo. 47, No. 7, Jul. 1999, pp. 983-988.

Behbahani et al, "A Broad-Band Tunable CMOS Channel-Select Filter for a Low-IF Wireless Receiver," 2000 IEEE Journal of Solid-State Circuits, vol. 35, No. 4, Apr. 2000, pp. 476-489.

Brown et al, "Digital L-Band Receiver Architecture with Direct RF Sampling," NAVSYS Corp., Colorado Springs, Colorado, Position Location and Navigation Symposium, 1994, IEEE, Apr. 11-15, 1994, pp. 209-216.

Copeland et al, "5-GHz SiGe HBT Monolithic Radio Transceiver with Tunable Filtering," 2000 IEEE Transactions on Microwave Theory and Techniques, vol. 48, No. 2, Feb. 2000, pp. 170-181.

Deleniv et al, "Tunable Ferroelectric Filter-Phase Shifter," University of Technology, Gothenburg, Sweden, 2003 IEEE MTT-S Digest, pp. 1267-1270.

Juodawlkis et al, "Optical Down-Sampling of Wide-Band Microwave Signals," Invited Paper, Journal of Lightwave Technology, vol. 21, No. 12, Dec. 2003, pp. 3116-3124.

Karvonen et al, "A CMOS Quadrature Charge-Domain Sampling Circuit with 66-dB SFDR Up to 100 MHz," 2005 IEEE Transactions on Circuits and Systems -I: Regular Papers, vol. 52, No. 2, Feb. 2005, pp. 292-304.

Koc et al, "Direct RF Sampling Continuous-Time Bandpass /spl Delta/-/spl Sigma/A/D Converter Design for 3G Wireless Applications," ISCAS 2004, May 23-26, 2004, vol. 1, pp. 409-412.

Latiri et al, "A reconfigurable RF sampling receiver for multistandard applications," Comptes Rendus Physique 7 (2006), pp. 785-793.

Lindfors et al, "A 3-V 230- MHz CMOS Decimation Subsampler," 2003 IEEE Transactions on Circuits and Systems - II: Analog and Digital Signal Processing, vol. 50. No. 3, Mar. 2003, pp. 105-117.

Loper, "A Tri-Phase Direct Conversion Receiver," Rockwell International, MILCOM 1990, Sep. 30-Oct. 3, 1990, pp. 1228-1232.

Luy et al, "Configurable RF Receiver Architecture," Daimler-Chrysler Research and Tecnology, Ulm, Germany, 2004 IEEE Microwave Magazine, Mar. 2004, pp. 75-82.

Minnis et al, "A Highly Digitized Multimode Receiver Architecture for 3G Mobiles," 2003 IEEE Transactions on Vehicular Technology, vol. 52, No. 3, May 2003, pp. 637-653.

Mirabbasi et al, "Classical and Modern Receiver Architectures," University of Toronto, 2000 IEEE Communications Magazine, Nov. 2000, pp. 132-139.

Mostafa et al, " WCDMA Receiver Architecture with Unique Frequency Plan," Micro Lnear Corp. San Jose, California and Texas Instruments, Inc., Dallas, Texas, ASIC/SOC Conference, 2001 Proceedings, 14th Annual IEEE International, Sep. 12-15, 2001, pp. 57-61.

Muhammad et al, "Direct RF Sampling Mixer With Recursive Filtering in Charge Domain," Texas Instruments Incorporated, Dallas, Texas, ISCAS, May 23-26, 2004, vol. 1, pp. 577-580.

Namgoong et al., "Direct-Conversion RF Receiver Design," 2001 IEEE Transactions on Communications, vol. 49, No. 3, Mar. 2001, pp. 518-529.

Pellon, "RF-to-Digital Receivers Employing Bandpass Multibit /spl Sigma//spl Delta/ ADC Architectures," Lockheed Martin Government Electronic Systems, Morristown, New Jersey, 20th Annual Gallium Arsenide Integrated Circuit (GaAs IC) Symposium, Nov. 1-4, 1998, pp. 11-14.

"Real-Time Sampling Downconverter Front Ends for Digital Radar and Wide-Bank Signaling," Picoscond Pulse Labs, 2500 55th Street, Boulder, CO 80301, (Nov. 2004).

Richter et al, "An Integrated Wideband-IF-Receiver Architecture for Mobile Terminals," Dresden University of Technology, Dresden, Germany, 2003 IEEE Radio Frequency Integrated Circuits Symposium, Jun. 8-10, 2003, pp. 583-586.

Shoji et al, "70-GHz-Band MMIC Transceiver With Integrated Antenna Diversity System: Application of Receive-Module-Arrayed Self-Heterodyne Technique," 2004 IEEE Transactions on Microwave Theory and Techniques, vol. 52, No. 11, Nov. 2004, pp. 2541-2549.

Springer et al, "RF System Concepts for Highly Integrated RFICs for W-CDMA Mobile Radio Terminals," 2002 IEEE Transactions on Microwave Theory and Techniques, vol. 50, No. 1, Jan. 2002, pp. 254-267.

Tatu et al, "Ka-Band Direct Digital Receiver," 2002 IEEE Transactions on Microwave Theory and Techniques, vol. 50, No. 11, Nov. 2002, pp. 2436-2442.

Tayebati et al, "Microelectromechanical tuneable filters with 0.47 nm linewidth and 70nm tuning range," Electonics Letters, Jan. 8, 1998, vol. 34, No. 1, pp. 76-78.

Thor et al, "A Direct RF Sampling Multifrequency GPS Receiver," Stanford University, Position Location and Navigation Symposium, 2002 IEEE, Apr. 15-18, 2002, pp. 44- 51.

Tsui et al, "Digital Microwave Receiver Technology," Invited Paper, 2002 IEEE Transactions on Microwave Theory and Techniques, vol. 50, No. 3, Mar. 2002, pp. 699-705.

Valkama et al., "Advanced Receiver Architectures and I/Q Signal Processing," Tampere University of Technology, Tampere, Finland, First International Symposium on Control, Communications and Signal Processing, IEEE Jun. 2004, pp. 71-74.

Vaughan et al, "The Theory of Bandpass Sampling," 1991 IEEE Transactions on Signal Processing, vol. 39, No. 9, Sep. 1991, pp. 1973-1984.

Wooten et al, "Rapidly Tunable Narrowband Wavelength Filter Using LiNbO3 Unbalanced Mach-Zehnder Interferometers," Journal of Lightwave Technology, vol. 14, No. 11, Nov. 1996, pp. 2530-2536.

Pepper et al, "NLTLs Push Sampler Products Past 100 GHz," Microwaves & RF, Oct. 2005, 6 pgs.

Model 7620 DCSM VME Card Datasheet, Revision C, Picosecond Pulse Labs, Boulder, Colorado, Sep. 2005, 10 pgs.

Wepman, "Analog - to- Digital Converters and Their Applications in Radio Receivers," 1995 IEEE Communications Magazine, May 1995, pp. 39-45.

U.S. Appl. No. 60/373,163 filed Apr. 17, 2002, "Tunable modules for frequency agile receivers."

Brueller et al, "On Non-uniform Sampling of Signals," Israel Institute of Technology, Haifa, Israel, ISIE, Jul. 7-10, 1998, pp. 249-252.

Candes et al, "Robust Uncertainty Principles: Exact Signal Reconstruction From Highly Incomplete Frequency Information," 2006 IEEE Transactions on Information Theory, Vo. 52, No. 2, Feb. 2006, pp. 489-509.

Donoho, "Compressed Sensing," 2006 IEEE Transactions on Information Theory, vol. 52, No. 4., Apr. 2006, pp. 1289-1306.

Dragotti et al, "Exact Sampling Results for Signals with Finite Rate of Innovation Using Strang-Fix Conditions and Local Kernels," ICASSP 2005, Mar. 18-23, 2005, pp. 233-236.

Dragotti et al, "Wavelet Footprints: Theory, Algorithms, and Applications," 2003 IEEE Transactions on Signal Processing, vol. 51, No. 5, May 2003, pp. 1306-1323.

Duarte et al, "Distributed Compressed Sensing of Jointly Sparse Signals," Rice University, Houston, Texas, Asilomar Conference on Signals, Systems and Computers 2005, Oct. 28-Nov. 1, 2005, pp. 1537-1541.

Gansman et al, "Single Frequency Estimation with Non-uniform Sampling," Asilomar Conference on Signals, Systems and Computers 1996, Nov. 3-6, 1996, vol. 1., pp. 399-403.

Herley et al, "Minimum Rate Sampling and Reconstruction of Signals with Arbitrary Frequency Support," 1999 IEEE Transactions on Information Theory, vol. 45, No. 5, Jul. 1999, pp. 1555-1564.

Kumar et al, "On Distributed Sampling of Bandlimited and Non-Bandlimited Sensor Fields," University of California, Berkeley, California, ICASSP 2004, May 17-21, 2004 vol. III., pp. 925-928.

Lefkaditis et al., Ambiguities in the harmonic retrieval problem using non-uniform sampling, IEE Proceedings—Radar, Sonar and Navigation, Dec. 2001, pp. 325-329.

Maravic et al, "Channel Estimation and Synchronization with Sub-Nyquist Sampling and Application to Ultra-Wideband Systems," ISCAS 2004, May 23-26, 2004, pp. V-381-V-384.

Maravic et al, "Sampling and Reconstruction of Signals With Finite Rate of Innovation in the Presence of Noise," 2005 IEEE Transactions on Signal Processing, vol. 53, No. 8, Aug. 2005, pp. 2788-2805.

Pace et al, "Use of the Symmetrical Number System in Resolving Single-Frequency Undersampling Aliases," 1997 IEEE Transactions on Signal Processing, vol. 45, No. 5, May 1997, pp. 1153-1160.

Sanderson et al, "Reduction of Aliasing Ambiguities Through Phase Relations," 1992 IEEE Transactions on Aerospace and Electronic Systems, vol. 28, No. 4, Oct. 1992, pp. 950-956.

Sayiner et al, "A Non-Uniform Sampling Technique for A/D Conversion," ISCAS 193, May 3-6, 1993, pp. 1220-1223.

Styer et al, "Two Channel RSNS Dynamic Range," 2002 IEEE Transactions on Circuits and Systems—I: Fundamental Theory and Applications, vol. 49, No. 3., Mar. 2002, pp. 395-397.

Vetterli et al, "Sampling Signals With Finite Rate of Innovation," 2002 IEEE Transactions on Signal Processing, vol. 50, No. 6, Jun. 2002, pp. 1417-1428.

Walter, "Non-Uniform Sampling in Wavelet Subspaces," University of Wisconsin, Milwaukee, Wisconsin, ICASSP 1999, pp. 2057-2059.

Xia, "An Efficient Frequency-Determination Algorithm from Multiple Undersampled Waveforms," 2000 IEEE Transactions on Signal Processing Letters, vol. 7, No. 2, Feb. 2000, pp. 34-37.

Xiong et al, "A Non-uniform Sampling Tangent Type FM Demodulation," 2004 IEEE Transactions on Consumer Electronics, vol. 50, No. 3., Aug. 2004, pp. 844-848.

Zhu et al, "Adaptive Non-Uniform Sampling Delta Modulation for Audio/Image Processing," 1996 IEEE Transactions on Consumer Electronics, vol. 42, No. 4, Nov. 1996, pp. 1062-1072.

PCT International Search Report, PCT/US2006/039615, Apr. 2, 2007.

PCT International Search Report, PCT/US2006/039506, Oct. 10, 2006.

PCT/US2008/013768, "International Search Report," Jul. 14, 2009.

U.S. Appl. No. 12/290,168, "Non-Final Office Action Mailed Sep. 21, 2011," filed Oct. 28, 2008.

U.S. Appl. No. 12/290,167, "Ex parte Quayle Office Action Mailed Sep. 7, 2011," filed Oct. 28, 2008.

European Patent Application No. EP 06 81 6596, "Supplementary European Search Report Dated Dec. 27, 2010," National phase entry date Mar. 20, 2008, for PCT/US2006/039506.

Artyukh, Yuri, et al., "Wideband RF Signal Digitising for High Purity Spectral Analysis," International Workshop on Spectral Methods and Multirate Signal Processing, XX, XX, Jun. 20, 2005, XP002357422.

Tarczynski, Andrzej, et al., "Optimal Periodic Sampling Sequences for Nearly-Alias-Free Digital Signal Processing," Conference Proceedings/IEEE International Symposium on Circuits and Systems (ISCAS): May 23-26, 2005, International Conference Center, Kobe, Japan, IEEE Service Center, Piscataway, NJ, May 23, 2005, pp. 1425-1428, XP010815958.

* cited by examiner

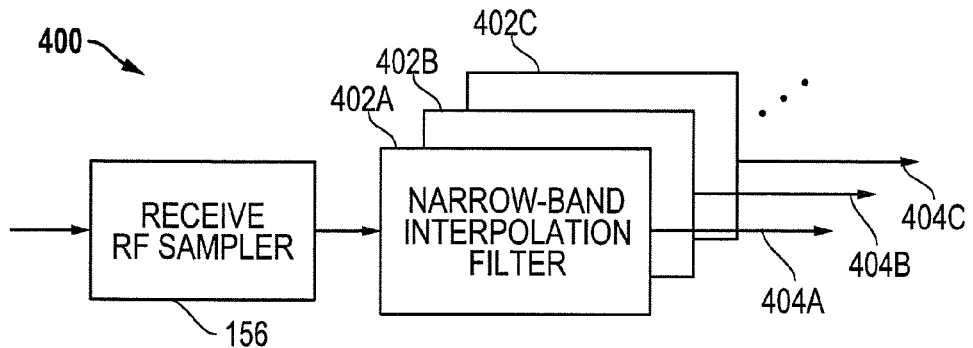
*FIG. 4A*
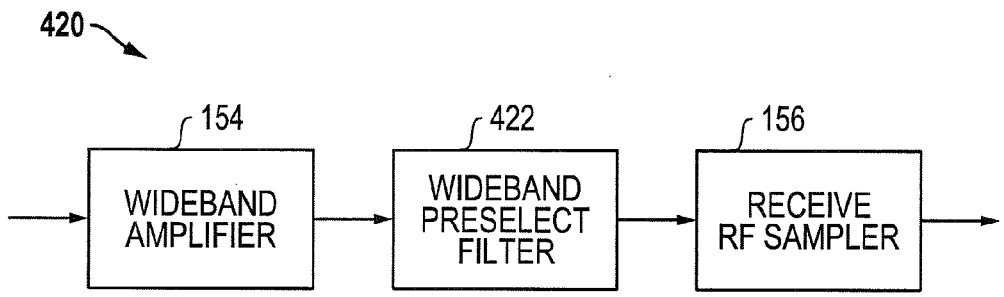
*FIG. 4B*
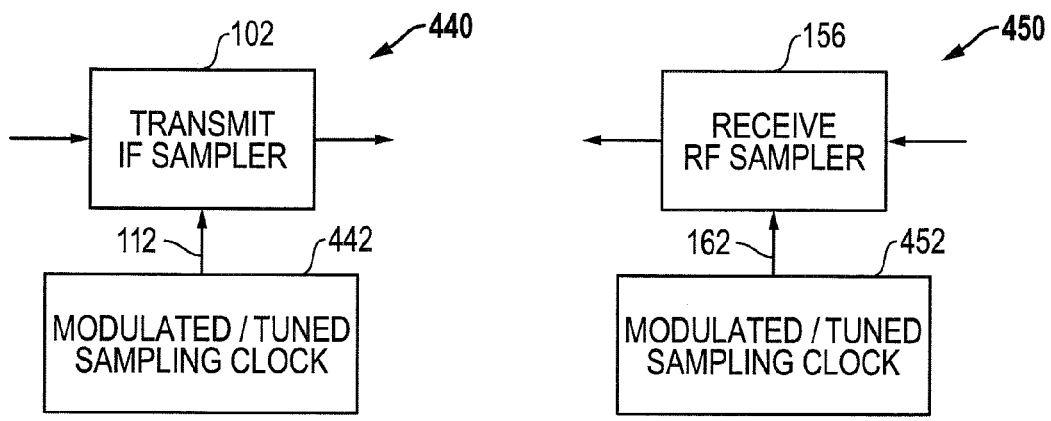
*FIG. 4C*  *FIG. 4D*

WIDEBAND FREQUENCY HOPPING SPREAD SPECTRUM TRANSMITTERS AND RELATED METHODS

RELATED APPLICATIONS

This application claims priority to the following provisional application: Provisional Application Ser. No. 61/008,239, which was entitled "WIDEBAND FREQUENCY HOPPING SPREAD SPECTRUM TRANSMITTERS AND RECEIVERS AND RELATED METHODS" and was filed on Dec. 19, 2007, and which is hereby incorporated by reference in its entirety.

This application is related in subject matter to concurrently filed applications: U.S. patent application Ser. No. 12/290,167, entitled "WIDEBAND FREQUENCY HOPPING SPREAD SPECTRUM TRANSCEIVERS AND RELATED METHODS," and U.S. patent application Ser. No. 12/290,168, entitled "WIDEBAND FREQUENCY HOPPING SPREAD SPECTRUM RECEIVERS AND RELATED METHODS," and which are each hereby incorporated by reference in its entirety.

This application is also related in subject matter to the following applications: U.S. patent application Ser. No. 11/545,310, entitled "DIRECT BANDPASS SAMPLING RECEIVERS WITH ANALOG INTERPOLATION FILTERS AND RELATED METHODS," which was filed on Oct. 10, 2006; and U.S. patent application Ser. No. 11/545,642, entitled "NYQUIST FOLDED BANDPASS SAMPLING RECEIVERS AND RELATED METHODS," which was filed on Oct. 10, 2006; and which are each hereby incorporated by reference in its entirety.

TECHNICAL FIELD OF THE INVENTION

This invention relates to receiver and transmitter architectures for efficient wireless communications and, more particularly, to receiver and transmitter architectures using spread spectrum techniques.

BACKGROUND

A wide variety of signals and related protocols exist for the use of radio frequency (RF) signals in communication systems and other devices, such as radar systems. A commonly desired characteristic for both communications and radar applications is to have a spread spectrum signal that is hard to intercept. Spread spectrum solutions utilize signals that are spread across a relatively wide spectral range of frequencies and, therefore, often have reduced interference and higher degrees of security than narrow band solutions.

One common approach to spread spectrum is frequency hopping. In a frequency hopping solution, the transmit/receive signals are moved around or hopped to different frequencies within a wide spectral range of frequencies. One practical limitation experienced by spread spectrum solutions, including spread spectrum frequency hopping solutions, is that the total frequency spread across a frequency spectrum is practically limited by the bandwidth of the circuitry being utilized. For example, receiver bandwidth is often limited by the signal-to-noise ratio (SNR) performance of the digitizing circuitry within the receiver. An extremely wide bandwidth ADC (analog-to-digital converter), for example, typically results in unacceptably low SNR.

SUMMARY OF THE INVENTION

The systems and methods disclosed herein provide ultra-wideband frequency hopping spread spectrum (UWB-FHSS) solutions for transmit architectures. These UWB-FHSS transmit architectures can transmit signals over an extremely wide bandwidth while using a relatively slow analog-to-digital converter (ADC) without suffering from unacceptable performance degradation. For example, ADCs can be used having sample rates lower than standard Nyquist criteria would require for the bandwidth of the spread spectrum utilized.

DESCRIPTION OF THE DRAWINGS

It is noted that the appended drawings illustrate only exemplary embodiments of the invention and are, therefore, not to be considered limiting of its scope, for the invention may admit to other equally effective embodiments.

FIGS. 4A-4D are block diagrams for alternative embodiments for UWB-FHSS receivers and transmitters.

DETAILED DESCRIPTION OF THE INVENTION

The systems and methods disclosed herein provide ultra-wideband frequency hopping spread spectrum (UWB-FHSS) solutions for transmit and receive architectures. These UWB-FHSS transmit and receive architectures can transmit and accurately digitize frequency hops over an extremely wide bandwidth while using a relatively slow analog-to-digital converter (ADC), such as an ADC with a sample rate slower than the standard Nyquist criteria given the bandwidth spread. The UWB-FHSS systems described herein can be utilized to provide transmitter and receiver solutions operating above about 1 GHz and having a wide bandwidth such as a bandwidth of about 10 GHz to 20 GHz or more. It is further noted that the UWB-FHSS systems described here are useful both for communication systems and radar systems.

Figure 1A:
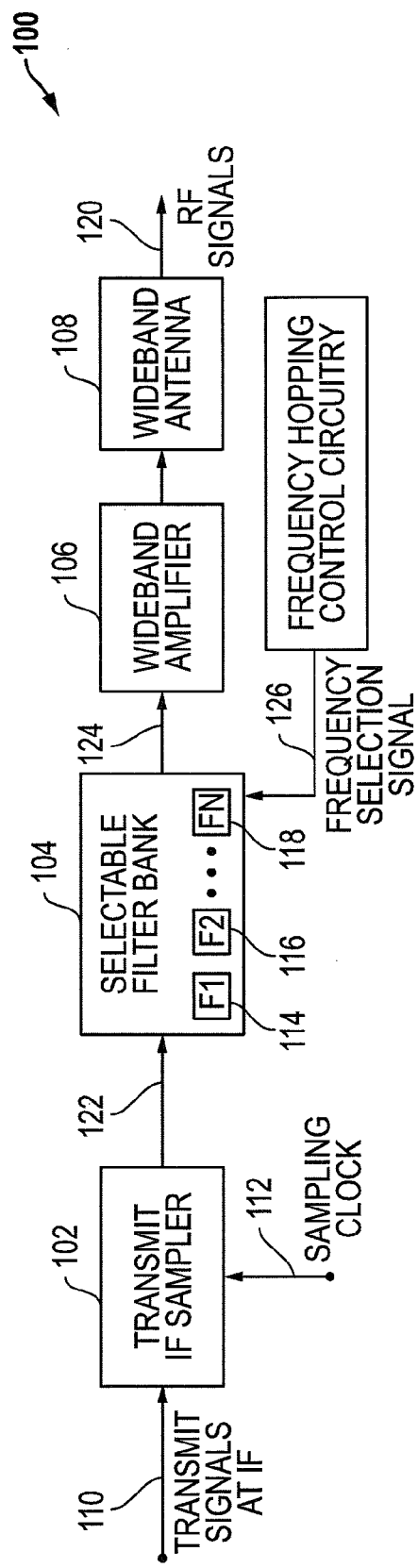
FIG. 1A is a block diagram for a ultra-wideband frequency hopping spread spectrum (UWB-FHSS) transmitter.

FIG. 1A is a block diagram for a UWB-FHSS transmitter 100. Transmit signals 110, for example, a signal pulse centered on an intermediate frequency (IF), are sent to a transmit IF sampler 102. The transmit IF sampler 102 receives a sampling clock signal 112 and a generates spread spectrum signal 122. As described in more detail below, spread spectrum signal 122 includes a plurality of individual frequency components spread across a wide frequency spectrum with components associated with the harmonics of the frequency of the sampling clock signal 112. As depicted, the spread spectrum signal 122 is applied to selectable filter bank 104. As depicted, selectable filter bank 104 has a plurality of selectable filters 114 (F1), 116 (F2) ... 118 (FN) and receives a frequency selection signal 126 that selects one of these filters. As also described in more detail below, each of these filters is associated with a harmonic of the sampling clock signal 112. When one of these filters is selected, one of the individual frequency components is allowed to pass on as a selected frequency hop 124. The selected frequency hop 124 from the selectable filter bank 104 will be associated with a harmonic of the sampling clock signal 112 depending upon which filter 114 (F1), 116 (F2) . . . 118 (FN) was selected by the frequency selection signal 126. The selected frequency hop is then sent to wideband amplifier 106 and then to wideband antenna 108 for transmission of transmit RF signals 120 that represent the individual frequency hop selected for transmission.

More generally, the selectable filter bank 104 can be frequency select filter circuitry configured to provide a plurality of different selectable filter passband frequency ranges across a bandwidth that includes at least the sampling clock frequency ($f_{CLK}$) and one harmonic of $f_{CLK}$, such that the frequency select filter circuitry has an output signal within a selected filter passband frequency range. A plurality of selectable filters, such as selectable filter bank 104, is one implementation for this frequency select filter circuitry. Another embodiment for the frequency select filter circuitry would be one or more tunable filters. In such an implementation, the frequency selection signal 126 would be controlling the tuning of the filter to be used. The frequency selection signal 126 could also be used to select the filter to be tuned if two or more tunable filters were being utilized.

Figure 1B:
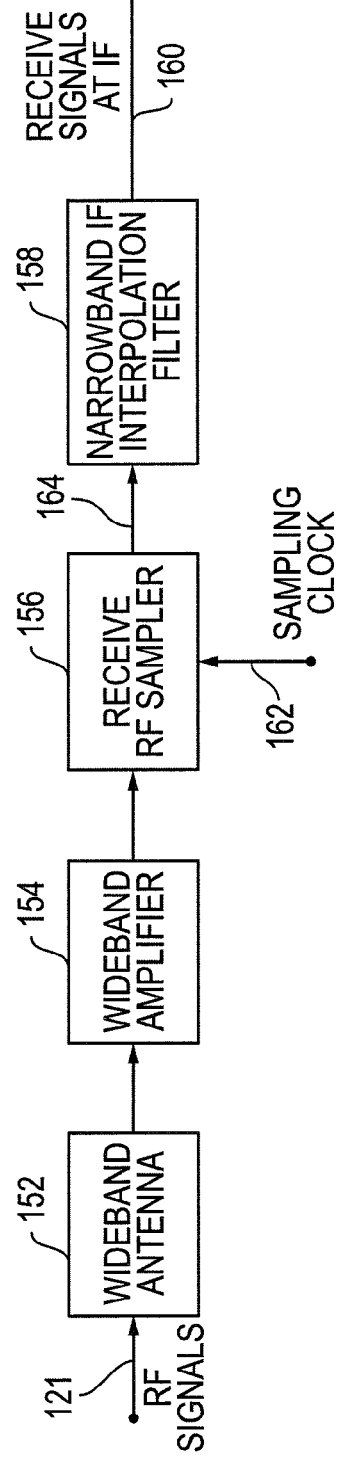
FIG. 1B is a block diagram for a UWB-FHSS receiver.

FIG. 1B is a block diagram for UWB-FHSS receiver 150. The RF signals 121 are received by a wideband antenna 152 and then sent to a wideband amplifier 154. The output of the wideband amplifier 154 is then sent to receive RF sampler 156. Receive RF sampler 156 also receives a sampling clock signal 162. This sampling clock signal 162 is used to down convert the RF signals down to lower frequencies through bandpass sampling. As described in more detail below, the receiver RF sampler 156 will output signals 164 that will include sampled signals associated with harmonics of the sampling clock signal 162. The sampling clock signal 162 is selected so that one of these sampled signals will fall on a desired intermediate frequency (IF) of the receiver 150. The sampled signals at IF are then processed with the narrowband IF interpolation filter 158 that is centered on the desired IF frequency. The narrowband IF interpolation filter 158 then outputs the receive IF signals 160 which are located at the IF frequency.

More generally, the narrowband IF interpolation filter 158 can be narrowband filter circuitry configured to receive the sampled signals and to output filtered signals at an intermediate frequency ($f_{IF}$). As such, the narrowband filter circuitry is configured to provide a filter passband frequency range around an intermediate frequency ($f_{IF}$). This filter passband frequency range is configured to match the intermediate frequency utilized to generate the signal being received by the UWB-FHSS receiver 150. In one implementation, the narrowband filter circuitry can be an interpolation filter 158.

Figure 2A:
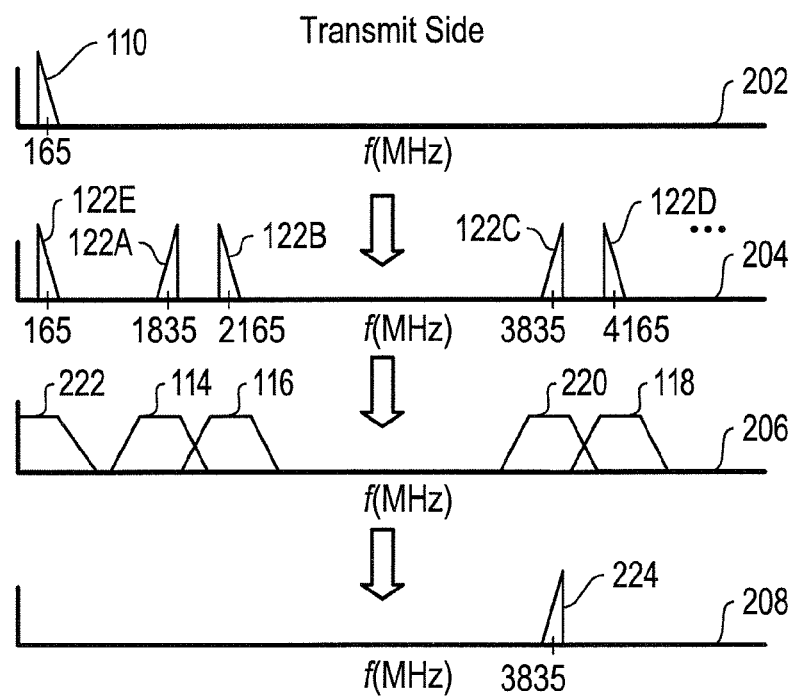
FIG. 2A is a signal diagram for a UWB-FHSS transmitter.
Figure 2B:
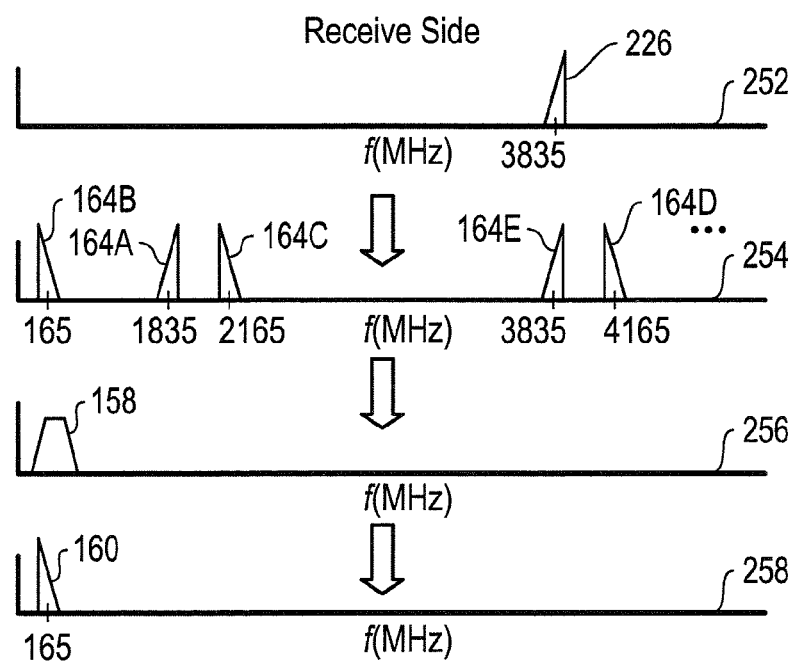
FIG. 2B is a signal diagram for a UWB-FHSS receiver.

FIG. 2A and FIG. 2B are signal diagrams that further describe the signals discussed with respect to FIG. 1A and FIG. 1B, respectively. For each of these diagrams, the sampling clock signal is assumed to be 2000 Mega-samples-per-second (Msps), and the IF is assumed to be 165 MHz. Also, for these diagrams, the frequency values are in MHz as designated by the f(MHz) indication. It is noted that for the UWB-FHSS receiver and transmitter embodiments described herein, a sampling clock frequency of about 1 GHz or more is desirable, and a bandwidth spanned by the minimum and maximum frequencies by the frequency select filter circuitry of about 10 to 20 GHz or more is desirable. It is further noted that an IF of about 200 MHz or less is also desirable. However, any IF could be selected as desired depending upon the particular application for the UWB-FHSS receivers and/or transmitters.

FIG. 2A represents transmit side signals for the UWB-FHSS transmitter 100. Signal diagram 202 is first and represents the transmit signal 110 which is centered on the IF frequency ($f_{IF}$) of 165 MHz. The signal diagram 204 is next and represents the output of the transmit IF sampler 102. The transmit IF sampler 102 will effectively combine the transmit signals 110 with the sampling clock ($f_S$) harmonics ($0f_S$, $1f_S$, $2f_S$, $3f_S$, $4f_S$, etc.) to create frequency components at $X \pm f_{IF}$ where X is the sampling clock harmonics and where $f_{IF}$ is the frequency of the incoming IF transmit signal. This process can be thought of as a convolution in frequency domain such that the two-sided IF signal spectra is convolved with the two-sided sampler spectra with harmonics 0, +/−1$f_S$, +/−2$f_S$, etc. to result in various frequency components. Assuming the sampling clock is 2000 Msps and the IF is 165 MHz, therefore, the transmit IF signal 110 at 165 MHz will in effect be combined with a DC signal ($0f_S$), the 2000 MHz clock signal, a 4000 MHz signal ($2f_S$), a 6000 MHz signal ($3f_S$), and so on. The result of this process creates frequency component 122E at 165 MHz associated with the DC or $0^{th}$ harmonic ($0f_S$), frequency components 122A at 1835 MHz and signal 122B at 2165 MHz that are associated with the sampling clock ($f_S$), frequency components 122C at 3835 MHz and signal 122D 4165 MHz that are associated with the second harmonic of the sampling clock ($2f_S$), and so on. The diagram 206 is next and represents the filters available in the selectable filter bank 104. As depicted these filters include filter 114 centered on 1835 MHz, filter 116 centered on 2165 MHz, filter 220 centered on 3835 MHz, filter 118 centered on 4165 MHz, and a low-pass filter 222 covering 165 MHz. Filter 220 has been selected by the frequency selection signal 126. Signal diagram 208 represents the output signal from the selectable filter bank 104. Because filter 220 has been selected, the output frequency hop 224 centered on 3835 MHz is passed through the filter bank.

FIG. 2B represents receive side signals for the UWB-FHSS receiver 150. Signal diagram 252 is first and represents the RF input signals received by the UWB-FHSS receiver 150. Assuming the transmitter 100 transmits a frequency hop 224 at 3835 MHz as in FIG. 2A, the frequency of the RF signal 226 being received is 3835 MHz. Signal diagram 254 is second and represents the output of receive RF sampler 156. The receive RF sampler 156 will effectively combine the receive signals 226 with the sampling clock ($f_S$) harmonics ($0f_S$, $1f_S$, $2f_S$, $3f_S$, $4f_S$, etc.) to create frequency images at $X \pm f_{RF}$ (the receive RF signal frequency component ($f_{RF}$) where X is the sampling clock harmonics. Assuming the sampling clock is 2000 Msps, therefore, the incoming RF signal 226 at 3835 MHz will in effect be combined with a DC signal ($0f_S$), the 2000 MHz clock signal ($1f_S$), a 4000 MHz signal ($2f_S$), a 6000 MHz signal ($3f_S$), and so on. As such, the DC or $0^{th}$ harmonic ($0f_S$) produces a signal 164E at 3835 MHz. The first harmonic ($1f_S$=2000 MHz) produces an image 164A at 1835 MHz and another image at a much higher frequency. The second harmonic ($2f_S$=4000 MHz) produces an image 164B at 165 MHz and another image at a much higher frequency. The third harmonic ($3f_S$=6000 MHz) produces an image 164C at 2165 MHz and another image at a much higher frequency. The fourth harmonic ($4f_S$=8000 MHz) produces an image 164D at 4165 MHz and another image at a much higher frequency, and so on. The diagram 256 is next and represents the narrowband IF interpolation filter 158 which has a passband filter response centered on the IF frequency of 165 MHz. Signal diagram 258 represents the receive signal images 160 at IF (e.g., 165 Mhz) that are output by the narrowband IF interpolation filter 158. These receive signal images 160 correspond to the image 164B that folded to the IF frequency of 165 MHz.

It is noted that the sampling clock signal frequency would be known to the receiver. It is further noted that the frequency hopping pattern used by the transmitter could also be known by the receiver, if desired. Frequency hopping has been used in many prior systems to provide for security in communications. It is difficult for an intercepting device to know where the transmitter will hop next. The frequency hopping receiver, however, will typically have prior knowledge of the hop sequence to be utilized. This prior knowledge can be implemented in a number of different ways. One example is to have a hop sequence table stored at both the receiver and transmitter. However, it is noted that a wide variety of implementations could be used to provide this hop sequence to be utilized by the transmitter and receiver for a given communication sequence.

With the systems and methods described herein, the frequency hopping pattern or sequence does not need to be known by the receiver because the receiver can simply use the image that folds to the IF (e.g., 165 MHz). If the same sampling clock frequencies are used by the transmitter and the receiver, then the frequency components would fold to the same frequencies. These techniques described herein, therefore, provide a significant advantage over prior frequency hopping receivers that require knowledge of the frequency hopping pattern. It is further noted that Doppler shift of received signals could also be determined by knowing where the signals should hop with no Doppler shift. Other variations could also be utilized, as desired, while still taking advantage of the wideband frequency hopping spread spectrum techniques described herein.

In some implementations, it may be desirable for the receive sample clock to be slightly different than the transmit sample clock. In this case, the signals would not alias to quite the same place. As such, a frequency hop table would be needed if it was desired to be able to estimate Doppler shift on the hop because the Doppler shift would result in a small frequency offset that might be ambiguous with the small change in frequency for the different hops.

Figure 3A:
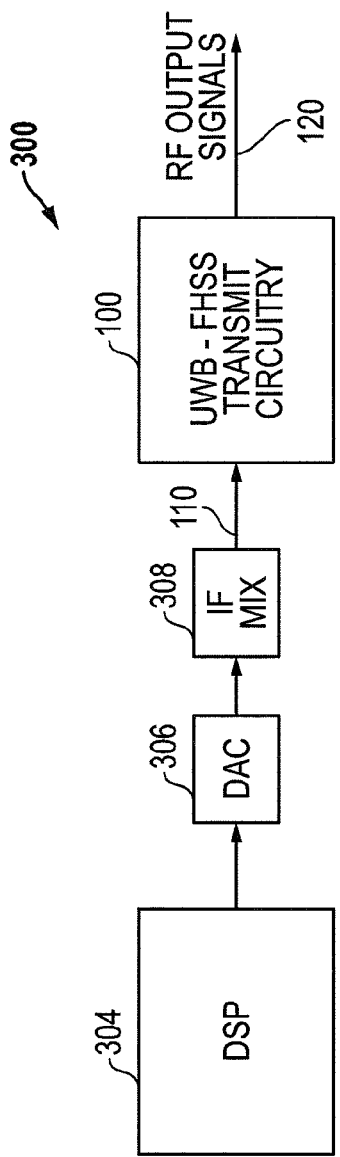
FIG. 3A is a block diagram for additional circuitry for a UWB-FHSS transmitter.

FIG. 3A is a block diagram for additional circuitry for a UWB-FHSS transmitter embodiment 300. As described above with respect to FIG. 1A, the transmit circuitry 100 receives IF transmit signals 110 and outputs the RF signals 120. The IF transmit signals 110 can be generated using digital signal processing (DSP) circuitry 304 to produce digital signals that are converted to analog signals using a digital-to-analog-converter (DAC) 306 and then mixed up to the IF frequency using IF mix circuitry 308.

Figure 3B:
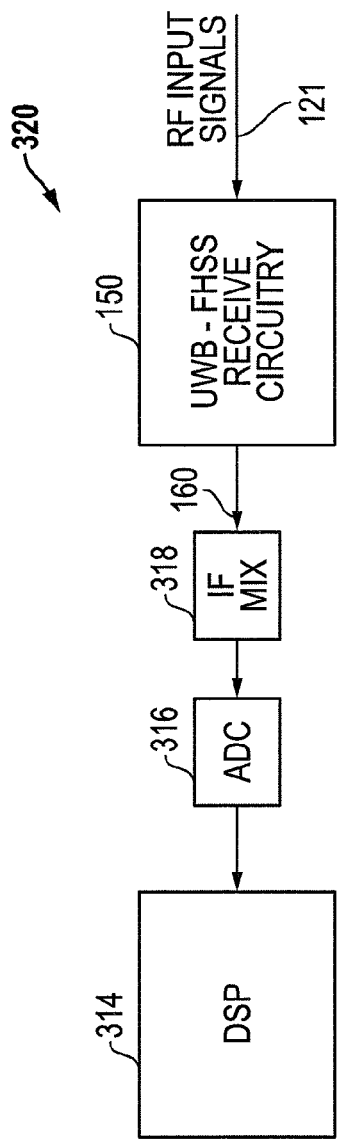
FIG. 3B is a block diagram for additional circuitry for a UWB-FHSS receiver.

FIG. 3B is a block diagram for additional circuitry 320 for a UWB-FHSS receiver embodiment. As described above with respect to FIG. 1B, the receive circuitry 150 receives RF input signals 121 and outputs IF receive signals 160. The IF receive signals 160 can be mixed down to an analog baseband signal using IF mix circuitry 318 and then digitized using analog-to-digital converter (ADC) 316. Alternatively, the IF receive signals can be provided directly to an ADC 316 implemented as a bandpass ADC or a low-pass ADC. In such a case, the IF mix circuitry 318 could be eliminated, if desired. The output of the ADC 316 can be provided to a DSP 314 for processing.

It is noted that for a transceiver embodiment, the transmit side DSP 304 and the receive side DSP 314 can be implemented using a single DSP, or two DSPs as desired, within a single transceiver device or system. This transceiver embodiment, therefore, would include the DSP 304, the DAC 306 and/or the IF mix circuitry 308, and this transceiver embodiment would also include the DSP 314, the ADC 316 and/or the IF mix circuitry 318. It is also noted that the transceiver embodiment could use a shared wideband antenna for both transmit and receive operations, if desired, or could be implemented by using separate transmit and receive antennas.

FIG. 4A is a block diagram for an alternative embodiment 400 for a UWB-FHSS receiver. In this embodiment, a plurality of narrow-band interpolation filters 402A, 402B, 402C . . . are used in place of the single narrow band interpolation filter 158 in FIG. 1B. As depicted, the plurality of narrow-band interpolation filters 402A, 402B, 402C . . . are coupled in parallel to receive the output of the receive RF sampler 156 and to produce respective output signals 404A, 404B, 404C . . .

The multiple interpolation filters 402A, 402B, 402C . . . can provide more flexibility in how the hops alias or fold back to IF. The parallel outputs 404A, 404B, 404C . . . can be processed to facilitate reception of transmitted signals, particularly where slightly different sample clocks are used for reception. For example, suppose that the transmit IF was 165 MHz and the transmit clock was 2000 Msps as shown in FIG. 2A, but also suppose that the receive clock was 2040 Msps instead of 2000 Msps. Then, the lower five transmit hop frequencies (165 MHz, 1835 MHz, 2165 MHz, 3835 MHz, 4165 MHz) would fold when received to (165 MHz, 205 MHz, 125 MHz, 245 MHz, 85 MHz, respectively). If a set of narrow-band interpolation filters were provided in parallel about these frequencies, the output could be bandpass sampled with a single ADC clocking at 100 Msps, for example, and the five transmit hop frequencies would end up at digital frequencies 0.7, 0.1, 0.5, 0.9, 0.3, respectively, on a [0,1] digital frequency scale. A single interpolation filter covering this frequency range could be used, but the possibility would exist for additional interferers in this band and the total bandwidth of the interpolation filter would exceed the Nyquist/Shannon criteria for the ADC. As such, interferers could ambiguously alias and cause confusion. In contrast, multiple narrowband interpolation filters about these frequencies, even with some finite bandwidth to account for Doppler shift (e.g., in the case of radar or in the case of a communications transmitter moving relative to the receiver), would allow unambiguous reception by the ADC because the different folded frequency hops would all alias to different digital regions with this example ADC clock. Significantly, these multiple narrowband interpolation filters, therefore, would allow the receive side to decrypt the hop sequence easily without having to synchronize anything between the receiver and the transmitter. Alternatively, it is further noted that a single interpolation filter could be used that covers all of the possible IF variations (e.g., passband covering 85 MHz to 245 MHz in the example above), if desired.

FIG. 4B is a block diagram for an alternative embodiment 420 for a UWB-FHSS receiver. In this embodiment, wideband pre-select filter circuitry 422 is added between the wideband amplifier 154 and the receive RF sampler 156.

FIG. 4C is a block diagram for an alternative embodiment 440 for a UWB-FHSS transmitter. For this embodiment, the transmit sampling clock signal 112 for the transmit IF sampler 102 can be generated as a modulated or tuned sampling clock signal by modulated/tuned sample clock circuitry 442. A modulated sampling clock signal is one that is adjusted over a given transmission cycle so that the clock is being adjusted as data is being transmitted. One example if a modulated sampling clock is one for which the frequency is ramped from one frequency to another during the transmission cycle. If the clock signal is modulated, then additional information can be provided in the transmitted signal to help later reception of the signals. Additionally, the signal can be further spread to reduce detectability. A tuned clock signal is one that is tuned to a given frequency for a transmission cycle but can be tuned to a different frequency for other transmission cycles. If the clock signal is tuned, then the frequency of any individual frequency hop can be adjusted for optimum performance. For example, crowded sections of the bandwidth can be avoided by tuning the transmit clock. It is additionally noted that both a modulated clock and a tuned clock could be used in the same implementation. In such a case, the tuning would likely occur first to select the starting clock frequency for the transmission cycle, and then the clock signal would be modulated during the transmission as desired.

FIG. 4D is a block diagram for an alternative embodiment 450 for a UWB-FHSS receiver. For this embodiment, the receive sampling clock 162 for the receive RF sampler can be generated as a modulated or tuned sampling clock signal by modulated/tuned sample clock circuitry 452. As with the transmitter embodiment 440 of FIG. 4C, therefore, the sampling clock signal 162 can be modulated during a receive cycle, tuned for a receive cycle, or both. Preferably, the modulation provided for a receive cycle would correspond to the modulation used by the transmitter. For example, if the transmit clock resulted in chirped hops, then the receive clock could de-chirp the hops. Similar to the fixed clock case, the tuning provided for the receive cycle would match the tuning used by the transmitter.

The use of tuned sampling clock signals and modulated sampling clock signals are discussed, for example, in U.S. patent application Ser. No. 11/545,310, entitled "DIRECT BANDPASS SAMPLING RECEIVERS WITH ANALOG INTERPOLATION FILTERS AND RELATED METHODS," which was filed on Oct. 10, 2006, and U.S. patent application Ser. No. 11/545,642, entitled "NYQUIST FOLDED BANDPASS SAMPLING RECEIVERS AND RELATED METHODS," which was filed on Oct. 10, 2006, the entire text and all contents for each of which are hereby expressly incorporated by reference in their entireties.

As described herein, the UWB-FHSS transmitter uses a frequency select filter to determine the transmit frequency. This frequency select filter can be related on the transmit side to the analog interpolation filter, except in reverse direction, as described in U.S. patent application Ser. No. 11/545,310, entitled "DIRECT BANDPASS SAMPLING RECEIVERS WITH ANALOG INTERPOLATION FILTERS AND RELATED METHODS," which was filed on Oct. 10, 2006, the entire text and all contents for each of which are hereby expressly incorporated by reference in their entireties. The frequency select filter in essence serves the function of the analog interpolation filter on the transmit side. In one embodiment, as described above, the frequency select filter is implemented as a bank of switchable filters, and the transmit frequency is hopped by selecting different filters over time. In this implementation, the individual frequency select filters can have relatively wide bandwidth and a relatively poor filter transition region because the various possible transmit frequency pulses are spaced apart by at least a minimum of two-times (2×) the IF frequency. This frequency spacing is advantageous because the resulting relaxed filter specifications for each frequency select filter makes a filter bank much easier to realize in a feasible and cost effective implementation.

It is further noted that the transmit frequency can also be adjusted by tuning the transmit IF sample clock, as indicated in FIG. 4C above. Also as shown in FIG. 4C above, the transmit frequency can have additional modulation induced by modulating the transmit IF sample clock to provide additional information on the transmitted frequency Nyquist zone (e.g., in case of timing ambiguity). In other words, the transmit IF sample clock can be tuned to different frequencies, or can be modulated over time, or both to adjust the transmit frequency.

The UWB-FHSS receiver is useful for receiving a frequency hop signal over an extremely wide bandwidth. This architecture is related to the receiver architectures described in U.S. patent application Ser. No. 11/545,310, entitled "DIRECT BANDPASS SAMPLING RECEIVERS WITH ANALOG INTERPOLATION FILTERS AND RELATED METHODS," which was filed on Oct. 10, 2006, and U.S. patent application Ser. No. 11/545,642, entitled "NYQUIST FOLDED BANDPASS SAMPLING RECEIVERS AND RELATED METHODS," which was filed on Oct. 10, 2006, the entire text and all contents for each of which are hereby expressly incorporated by reference in their entireties. In contrast with these previous architectures, however, the UWB-FHSS receiver described herein uses a narrow bandwidth interpolation filter, as shown with respect to FIG. 1B, and can also use multiple narrow-band interpolation filters, as shown with respect to FIG. 4A. In this latter embodiment, the filters can be implemented as bandpass filters corresponding to the desired frequency hop with the frequencies of the hops being selected to alias into the interpolation filter. Another variation of the UWB-FHSS receiver, as described with respect to FIG. 4B, uses a wideband pre-select filter. This embodiment can be used to simplify the design of the receiver. However, possibly degraded performance could result because signals at frequencies other than the desired hops would likely be captured by the RF sampling process, although the narrow bandwidth interpolation filter will help to remove these undesired signals.

As a further modification and alternative implementation, the frequency hops may be selected to alias to slightly different frequencies at the output of the interpolation filter. As indicated above, if slightly different hop frequencies are desired as opposed to significantly different hop frequencies, the receive sample clock could be selected to be slightly different from the transmit clock. For example, if the receive sample clock was 2005 Msps, the folded hops when received would be 165 MHz, 170 MHz, 160 MHz, 175 MHz, and 155 MHz, respectively. Also, as described with respect to FIG. 4D, the RF sample clock may be modulated to provide additional spur-free dynamic range. It is noted that if the frequency hops alias to slightly different frequencies or if the RF sample clock is modulated, then the bandwidth of the interpolation filter can be made wide enough to take this into account. If the frequency hops alias to significantly different frequencies, then multiple narrow-band interpolation filters could be used as shown in FIG. 4A.

Figure 5:
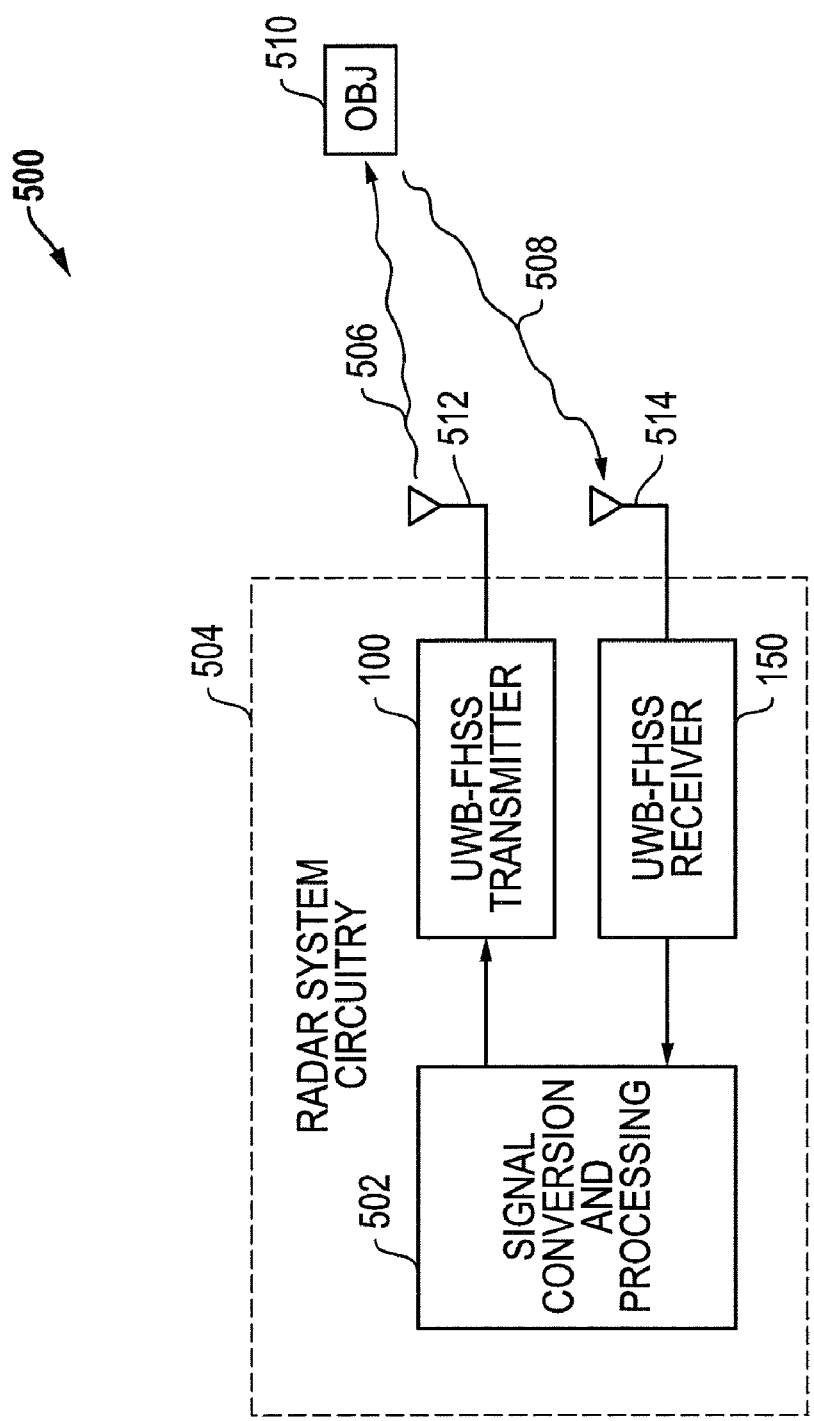
FIG. 5 is a block diagram for a radar system embodiment utilizing UWB-FHSS transmitters and UWB-FHSS receivers as described herein.

FIG. 5 is a block diagram for a radar system embodiment 500 utilizing UWB-FHSS transmitters and UWB-FHSS receivers as described herein. As depicted, radar system circuitry 504 includes UWB-FHSS transmitter circuitry 100 coupled to a transmit antenna 512 and to signal conversion and process circuitry 502. Radar system circuitry 504 also includes UWB-FHSS receiver circuitry 150 coupled to a receive antenna 514 and to signal conversion and processing circuitry 502. In operation, the frequency component signals 506 transmitted by the UWB-FHSS transmitter circuitry 100 through the transmit antenna 512 will strike objects, such as object (OBJ) 510, causing return frequency component signals 508 to be received at the receive antenna 514. The UWB-FHSS receiver circuitry 150 can then receive these receive frequency signals and provide them to the signal conversion and processing circuitry 502 for more processing to determine the location of the object (OBJ) 510. It is noted that a shared antenna could also be used, if desired.

Figure 6:
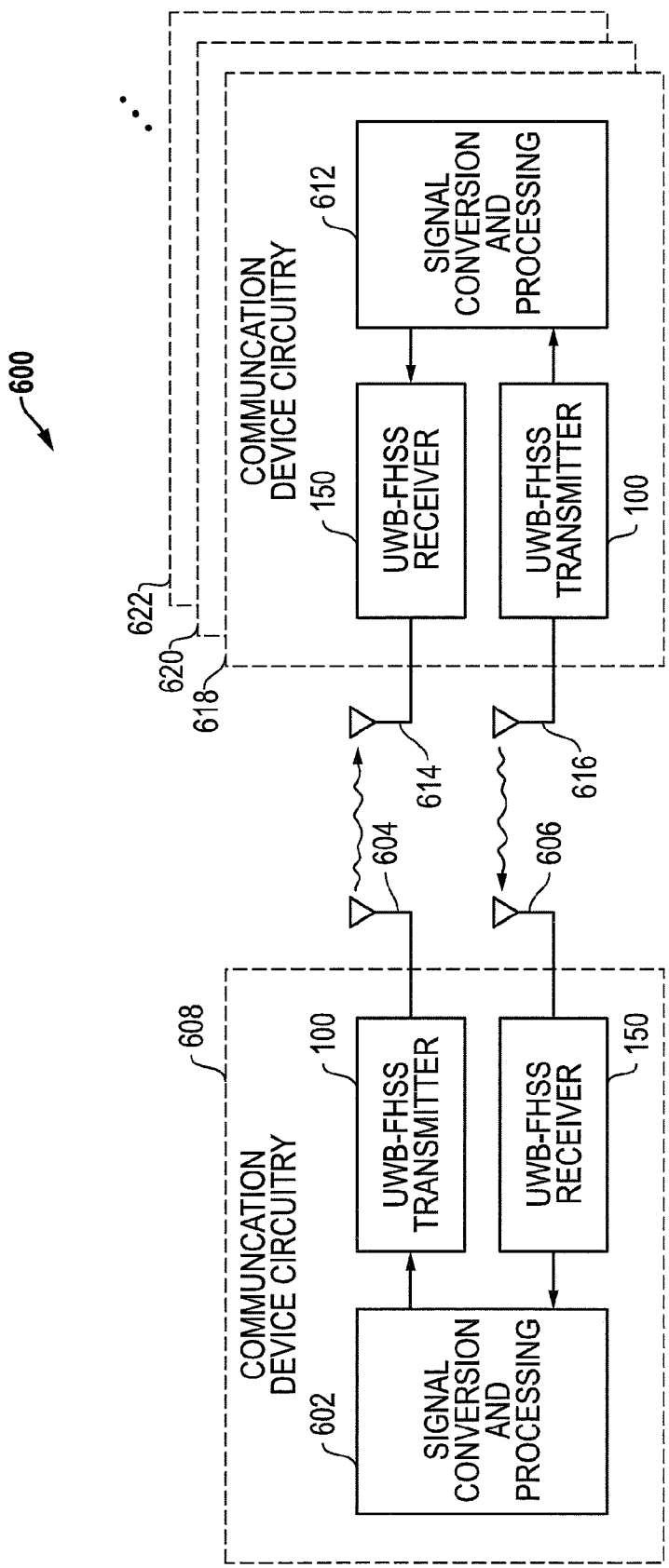
FIG. 6 is a block diagram for a communication system embodiment utilizing UWB-FHSS transmitters and UWB-FHSS receivers as described herein.

FIG. 6 is a block diagram for a communication system embodiment 600 utilizing UWB-FHSS transmitters and UWB-FHSS receivers as described herein. As depicted, communication device circuitry 608 includes signal conversion and processing circuitry 602 coupled to UWB-FHSS transmitter circuitry 100 and to UWB-FHSS receiver circuitry 150. With respect to antennas 604 and 606 for communication device circuitry 608, frequency component signals are transmitted through transmit antenna 604 to communication device circuitry 618 and are received from communication device circuitry 618 through receive antenna 606. Similarly, communication device circuitry 618 includes signal conversion and processing circuitry 612 coupled to UWB-FHSS transmitter circuitry 100 and to UWB-FHSS receiver circuitry 150. With respect to antennas 614 and 616 for communication device circuitry 618, frequency component signals are transmitted through transmit antenna 616 to communication device circuitry 608 and received from communication device circuitry 608 through receive antenna 614. It is again noted that shared antennas could be utilized, if desired. Still further, it is noted that additional communication devices 620, 622 . . . could be included, as well, for communication with communication device circuitry 608 and/or themselves.

Figure 7:
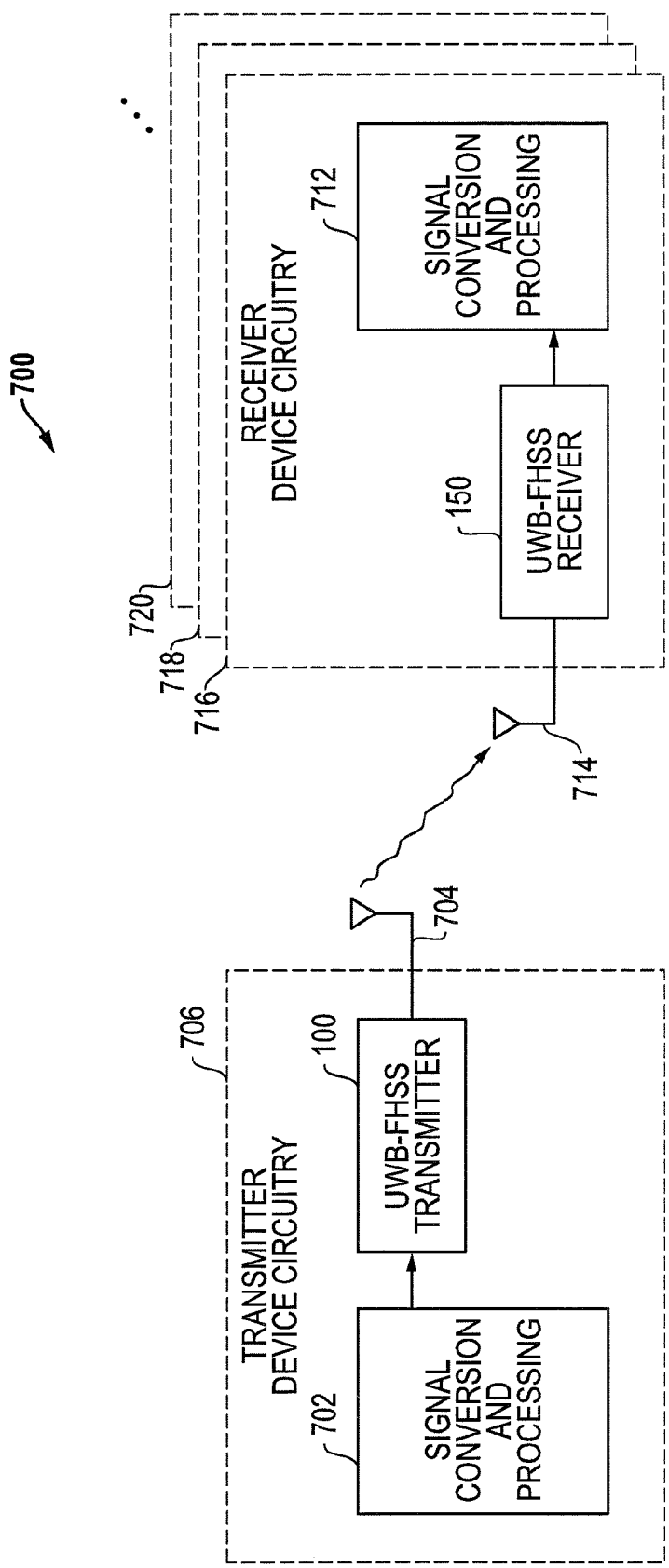
FIG. 7 is a block diagram for a transmitter-to-receiver broadcast system embodiment utilizing UWB-FHSS transmitters and UWB-FHSS receivers as described herein.

FIG. 7 is a block diagram for a transmitter-to-receiver broadcast system embodiment 700 utilizing UWB-FHSS transmitters and UWB-FHSS receivers as described herein. As depicted, transmitter device circuitry 706 includes signal conversion and processing circuitry 702 coupled to UWB-FHSS transmitter circuitry 100. Frequency component signals are transmitted through transmit antenna 704 to communication device circuitry 716. Receiver device circuitry 716 includes signal conversion and processing circuitry 712 coupled to UWB-FHSS receiver circuitry 150. Frequency component signals are received from transmitter device circuitry 706 through the receive antenna 714. Still further, it is noted that additional communication devices 718, 720 . . . could be included, as well, for receiving signals transmitted by the transmitter device circuitry 706.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A wideband frequency hopping spread spectrum transmitter, comprising:
    sampling circuitry configured to receive a transmit signal at an intermediate frequency ($f_{IF}$) and to receive sampling signals at a sample clock frequency ($f_S$) and configured to generate sampled output signals having a plurality of frequency components, the frequency components including frequencies at two or more harmonics of $f_S$ plus and minus $f_{IF}$;
    frequency select filter circuitry configured to receive the sampled output signals and to receive a frequency selection signal, the frequency select filter circuitry configured to provide a plurality of different selectable filter passband frequency ranges across a bandwidth that includes at least two harmonics of the sample clock frequency ($f_S$), the frequency select filter circuitry further having an output signal within a selected filter passband frequency range that includes one frequency component of the sampled output signals; and
    frequency hopping control circuitry configured to output the frequency selection signal and to adjust the frequency selection signal over time so that the output signal hops to different frequency components depending upon the selected filter passband frequency range.

2. The wideband frequency hopping spread spectrum transmitter of claim 1, wherein the plurality of frequency components for the sampled output signals comprises a DC harmonic frequency component, having a frequency at DC plus $f_{IF}$, and a $1f_S$ frequency component, having frequencies at $1f_S$ plus and minus $f_{IF}$.

3. The wideband frequency hopping spread spectrum transmitter of claim 1, further comprising amplifier circuitry configured to receive the output signal from the frequency select filter circuitry and to provide an amplified output signal to an antenna.

4. The wideband frequency hopping spread spectrum transmitter of claim 1, wherein the frequency select filter circuitry comprises a plurality of different selectable filters, wherein each selectable filter having a passband frequency range configured to pass one frequency component of the sampled output signals, and wherein the frequency selection signal is configured to select one of the different selectable filters.

5. The wideband frequency hopping spread spectrum transmitter of claim 1, wherein the frequency select filter circuitry comprises a tunable filter configured to be tuned to a passband frequency range to pass one frequency component of the sampled output signals, and wherein the frequency selection signal is configured to tune the tunable filter to a selected passband frequency range.

6. The wideband frequency hopping spread spectrum transmitter of claim 1, wherein the sample clock frequency ($f_S$) is about 1 GHz or greater and the intermediate frequency ($f_{IF}$) is about 200 MHz or less.

7. The wideband frequency hopping spread spectrum transmitter of claim 6, wherein the bandwidth spanned by the minimum and maximum frequencies of the frequency select filter circuitry is about 10 GHz or more.

8. The wideband frequency hopping spread spectrum transmitter of claim 1, wherein the sampling clock signal comprises a modulated sampling clock signal.

9. The wideband frequency hopping spread spectrum transmitter of claim 1, wherein the sampling clock signal comprises a tuned sampling clock signal.

10. The wideband frequency hopping spread spectrum transmitter of claim 1, further comprising a digital signal processor (DSP) configured to output a digital transmit signal, a digital-to-analog converter (DAC) configured to receive the digital transmit signal and output an analog transmit signal, and mixer circuitry configured to receive the analog transmit signal and output the transmit signal received by the sampling circuitry.

11. A method for transmitting wideband frequency hopping spread spectrum signals, comprising:
    sampling a transmit signal at an intermediate frequency ($f_{IF}$) using sampling signals at a sample clock frequency ($f_S$) to generate sampled output signals having a plurality of frequency components, the frequency components including frequencies at two or more harmonics of $f_S$ plus and minus $f_{IF}$;

providing a frequency selection signal using frequency hopping control circuitry;

selecting one of the frequency components for the sampled output signals based upon the frequency selection signal using frequency select filter circuitry, the frequency select filter circuitry being configured to provide a plurality of different selectable filter passband frequency ranges across a bandwidth that includes at least two harmonics of the sample clock frequency ($f_S$), the frequency select filter circuitry having an output signal within a selected filter passband frequency range that includes one frequency component of the sampled output signals;

transmitting the selected frequency component;

adjusting the frequency selection signal using the frequency hopping control circuitry; and repeating, providing, selecting, transmitting, and adjusting steps so that the output signals hops to different frequency components depending upon the selected filter passband frequency range.

12. The method of claim 11, wherein the sampling step comprises generating a plurality of frequency components for the sampled output signals including a DC harmonic frequency component, having a frequency at DC plus $f_{IF}$, and a $1f_S$ frequency component, having frequencies at $1f_S$ plus and minus $f_{IF}$.

13. The method of claim 11, wherein the selecting step comprises providing a plurality of selectable filters each having a passband frequency range configured to pass one frequency component of the sampled output signals and selecting one of the plurality of different selectable filters to pass one of the frequency components.

14. The method of claim 11, wherein selecting step comprises providing a tunable filter configured to be tuned to a passband frequency range to pass one frequency component of the sampled output signals, and tuning the tunable filter to pass one of the frequency components.

15. The method of claim 11, wherein the sampling step comprises using a sample clock frequency ($f_S$) of about 1 GHz or greater and an intermediate frequency ($f_{IF}$) of about 200 MHz or less.

16. The method of claim 15, wherein the bandwidth spanned by the minimum and maximum frequencies of the frequency select filter circuitry is about 10 GHz or more.

17. The method of claim 11, wherein the sampling step comprises using a sampling clock signal comprising a modulated sampling clock signal.

18. The method of claim 11, wherein the sampling step comprises using a sampling clock signal comprising a tuned sampling clock signal.

19. The method of claim 11, further comprising digitally processing signals to produce a digital transmit signals, converting the digital transmit signal to an analog transmit signal, and mixing the analog transmit signal to produce the transmit signal for the sampling step.

* * * * *